Oct. 18, 1932.  A. B. SOLVE  1,883,040
WARNING SIGNAL FOR DEFLATED TIRES
Filed Aug. 6, 1930
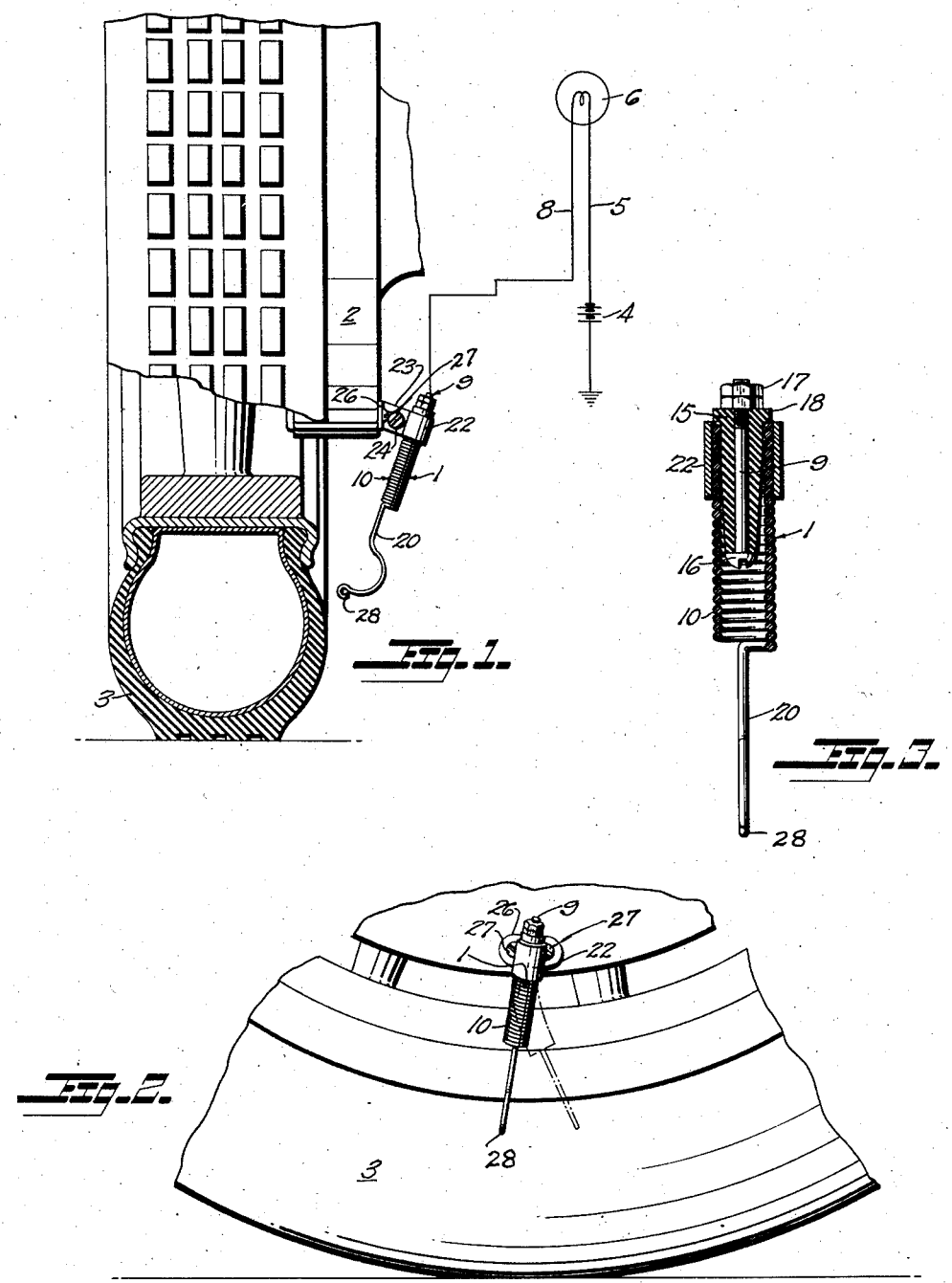
INVENTOR.
ALFRED B. SOLVE.
BY *Joseph B. Gardner*
ATTORNEY.

Patented Oct. 18, 1932

1,883,040

UNITED STATES PATENT OFFICE

ALFRED B. SOLVE, OF OAKLAND, CALIFORNIA

WARNING SIGNAL FOR DEFLATED TIRES

Application filed August 6, 1930. Serial No. 473,472.

This invention relates to a device for indicating the deflation of a vehicle tire and has particular reference to an improved means for making a visual or audible signal whenever the air pressure of such a tire drops below that predetermined pressure deemed necessary to insure safe driving and efficient tire use and to prevent damage to or undue wear of the tires.

An object of the invention is to provide a device of the character described which is simple and inexpensive as to construction, easy to install and reliable in operation, primarily due to the fact that said device is free from connection with and forms no part of the rotating parts of the vehicle wheel with which it is associated.

Another object is to provide a device of the character described which in its entirety is fixed to a non-rotating portion of the vehicle and independent of the vehicle wheel and tire and depends entirely upon engagement thereof with the tire in order to be operated, rather than engagement of the device with the ground, said engagement thereof with the tire taking place only when the tire becomes deflated.

A further object is to provide a device of the character described which will be inconspicuous at all times and in no way detract from the appearance of the wheel and tire with which it is associated, nor in any way interfere with the removal and replacement of the wheel or tire.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing,

Figure 1 represents a vertical sectional view of a vehicle wheel with a tire thereon, illustrating the device of my invention when installed for indicating the deflations of the tire, and a diagram of the electrical circuit for the device.

Figure 2 is a fragmentary side elevation of the showing of Figure 1.

Figure 3 is a vertical sectional view of the device as when removed.

The present embodiment of my invention, as shown in the accompanying drawing, comprises a flexible and resilient circuit closing device generally designated 1 and arranged to be attached to the fixed brake shield 2 or some other fixed part of an automobile or other motor vehicle in such position that when the tire 3 becomes deflated and consequently is flattened or otherwise distorted, said tire will engage and move said device into circuit closing position. Any suitable indicating or signalling means preferably located on the instrument board, not shown, or in sight of or near the driver, may be arranged to be operated electrically when the circuit closing device is actuated as aforementioned. As here shown the electrical circuit includes a source 4 such as a battery one side of which is grounded to the metal of the automobile as is customary. The other side of the circuit includes a conductor 5 leading to an indicator or signal, which in this instance is represented as an electric light 6. From this light a conductor 8 leads to a contact member 9 of the circuit closer 1. This circuit closer contact is normally spaced from the other contact member 10 of the circuit closer which latter is grounded to the metal of the automobile. However, upon deflation of the tire, as will be more fully described hereinafter, the contacts 9 and 10 engage one another and close the circuit for the signal lamp 6.

It should be noted that the circuit closer 1 is stationary and fixed to a non-rotating part of the vehicle, there being no part thereof attached to or arranged to rotate with the wheel. Yet the circuit closer is actuated solely by contact of the tire therewith. These features are important in that the device may be more readily and easily installed and may be made more simple and less expensive than a device which must be attached to the wheel to rotate therewith. Furthermore, the arrangement aforesaid insures an accurate operation and does not necessitate removal or dismantling of the device when the wheel or tire is removed and replaced.

In the present embodiment the contact member 9 of the circuit closer 1 comprises a screw inserted through a tubular insulation member 15 in such manner that the screw head 16 is disposed at one end of said member 15 whereas nuts 17 are screwed on the other end of said screw to hold the parts together and provide a binding post for the conductor 8.

The other contact member 10 is in the form of a helical spring and is fitted over the insulation member 15 so as to be frictionally retained thereon with one end abutting an enlargement 18 of the insulation member and the other end extending well beyond said insulation member. The head 16 of the screw contact member 9 is therefore surrounded by the mid portion of the coiled spring contact 10 but is normally spaced therefrom. However, upon flexing of spring 10 in any direction out of its normal straight extent, said spring will be moved into engagement with said contact 9 and close the circuit for the signal as aforementioned.

The wire from which the coiled spring 10 is formed is extended as a curved arm 20 from the lower or free end of the spring so that it may be disposed to one side of and slightly upwardly or inwardly of the tire in spaced relation thereto as particularly shown in Figure 1.

In order to attach the circuit closer 1 to the vehicle and at the same time electrically connect the spring contact member 10 in the grounded side of the signal circuit, I may use as here shown a combined clamp and bracket consisting of a clamp portion 22 arranged to embrace the spring contact 10 and the enlarged portion 18 of the member 15. Extending from the clamp portion are apertured ears 23 through which a bolt 24 is inserted. On the bolt is a nut (not shown) providing for forcing the ears together whereby to clamp the portion 22 on the contact 10. Extending from said ears are bracket portions 26 which are arranged to lie upon the brake shield 2 and to be secured thereto by suitable fastenings 27. It should be noted that the bracket-clamp is of angular formation whereby the spring contact 10 will extend downward and outward in an inclined plane. This disposes the arm 20 which may have an eye 28 or otherwise rounded free terminal, with said eye in position to be engaged by the tire when the latter becomes deflated. This arm may be bent or the device as a whole adjusted as desired to cause the tire to engage the arm when the pressure in the tire drops below a predetermined pressure which is not suited to safe and efficient tire operation. Should the pressure drop below such a predetermined point the tire will expand not only laterally but inwardly towards and will engage said arm 20 at the eye 28 thereof. The arm and spring contact 10 will then be swung or flexed and the spring 10 will engage the contact 9 and close the circuit for the signal lamp 6. The arm 20 will be intermittently engaged and moved in this fashion incident to the lateral deformations of the deflated tire caused by encountering road surface irregularities or bumps. Therefore the light 6 flashing on and off will warn the driver that the tire or tires, as the case may be, since each tire will have a separate signal device arranged as hereinbefore described, has become deflated to an extent requiring inflation. It is to be noted that the means for affixing the circuit closer to the brake shield 2 is also arranged so as to dispose the spring contact 10 in a position inclined from the vertical in the opposite direction it is to be flexed, as particularly shown in Figure 2. This insures a flexing of the spring contact 10 when engaged by the tire. Attention is also called to the fact that the long curved arm 20 will yield to prevent the shock of impact with the tire from distorting or deranging the spring.

It will thus be seen that my device provides for a saving in tires and operates to provide the other advantages and objects hereinbefore noted in a particularly efficient manner.

I claim:

1. In a warning signal for a deflated vehicle tire, a circuit closer arranged to control an electric circuit for a signal device, and comprised of normally spaced contact members one of which is movable into contact with the other solely by engagement thereof with a tire when the latter becomes deflated, and means for fixing the circuit closer to a stationary part of the vehicle and independently of a wheel thereof with said movable contact in position to be engaged and moved as aforementioned by the tire on said wheel, said movable contact comprising a coiled spring surrounding the other contact.

2. In a warning signal for a deflated vehicle tire, a circuit closer arranged to control an electric circuit for a signal device, and comprised of normally spaced contact members one of which is movable into contact with the other solely by engagement thereof with a tire when the latter becomes deflated, means for fixing the circuit closer to a stationary part of the vehicle and independently of a wheel thereof with said movable contact in position to be engaged and moved as aforementioned by the tire on said wheel, said movable contact comprising a coiled spring surrounding the other contact, and an arm extending from said spring as the portion to be engaged by said tire.

3. In a warning signal for a deflated vehicle tire, a circuit closer arranged to control an electric circuit for a signal device, and comprised of normally spaced contact members one of which is movable into contact with the other solely by engagement thereof with a tire when the latter becomes deflated, and means for fixing the circuit closer to a stationary part of the vehicle and independently of a wheel thereof with said movable contact in position to be engaged and moved as aforementioned by the tire on said wheel, said movable contact comprising a coiled spring surrounding the other contact, and a resilient arm extending from said spring as the portion to be engaged by said tire.

4. In a warning signal for a deflated vehicle tire, a circuit closer arranged to control an electric circuit for a signal device, and comprised of normally spaced contact members one of which is movable into contact with the other by engagement thereof with a tire when the latter becomes deflated, said movable contact comprising a coil spring and said other contact being disposed within said coil spring.

5. In a warning signal for a deflated vehicle tire, a circuit closer arranged to control an electric circuit for a signal device, and comprised of normally spaced contact members one of which is movable into contact with the other by engagement thereof with a tire when the latter becomes deflated, said movable contact comprising a coil spring adapted to be deflected upon deflation of said tire to place a portion of said coil in contact with said other contact member.

In testimony whereof I have hereunto set my hand at Oakland, California, this 28th day of July, 1930.

ALFRED B. SOLVE.